Dec. 12, 1933.  J. M. MAJEWSKI, JR  1,939,307
JUICE EXTRACTOR
Filed Nov. 21, 1932
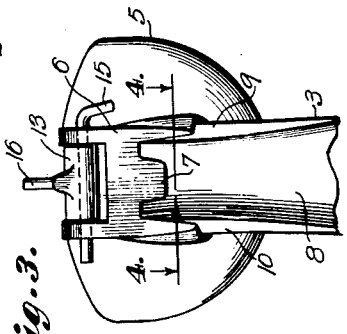
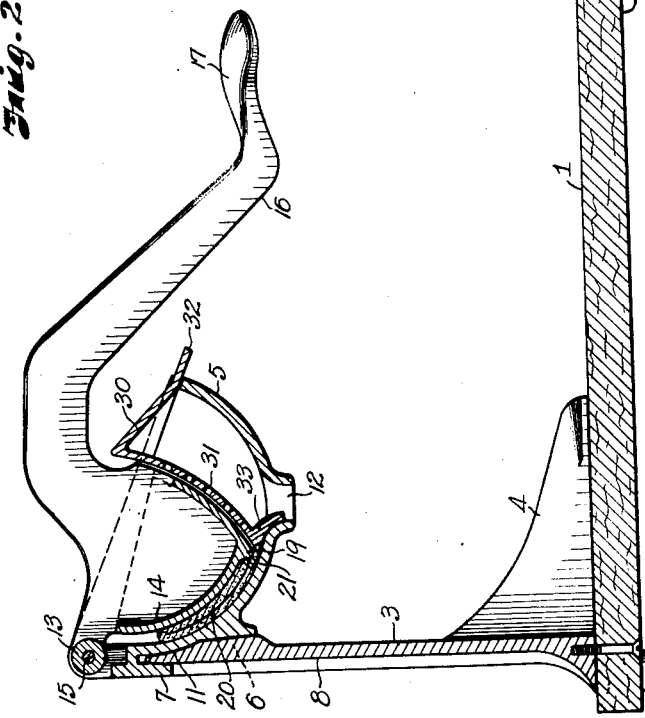
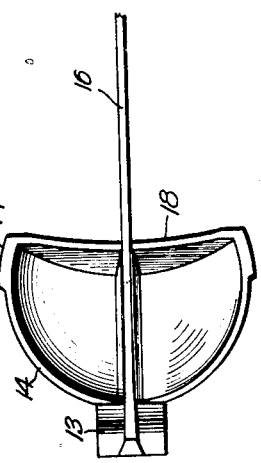
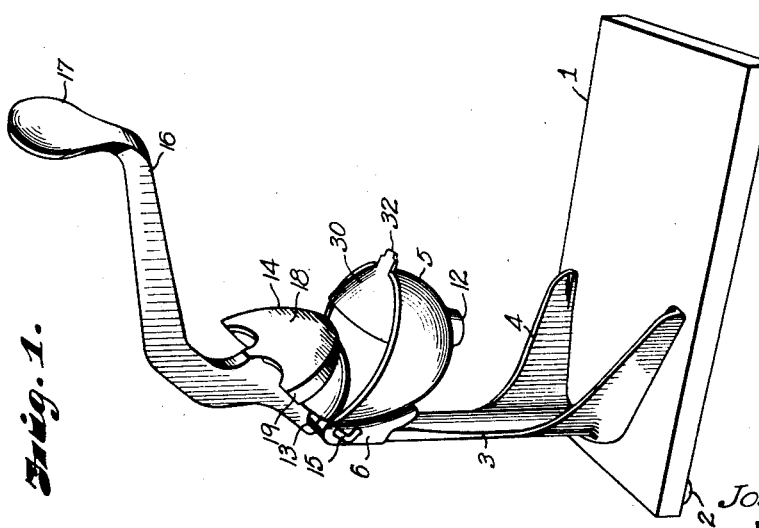
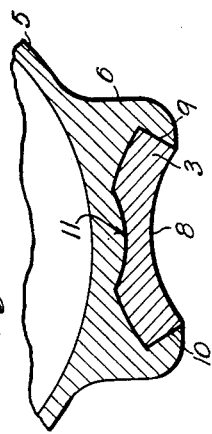
INVENTOR
Joseph M. Majewski Jr.
BY Thos. E. Scofield
ATTORNEY Patented Dec. 12, 1933

1,939,307

UNITED STATES PATENT OFFICE 1,939,307

JUICE EXTRACTOR

Joseph M. Majewski, Jr., Kansas City, Mo., assignor to Foster L. Talge, operating as Rival Manufacturing Company, Kansas City, Mo.

Application November 21, 1932
Serial No. 643,680

2 Claims. (Cl. 100—41)

My invention relates to a juice extractor and more particularly to a fruit press adapted to extract juice from limes, lemons, grapefruit and oranges or the like. My device is also adapted to squeeze tomatoes and other fruit.

Another object of my invention is to provide a juice extractor which will not break the orange peel in the process of extracting juice.

Another object of my invention is to provide a juice extractor which will squeeze the juice from the largest sized orange with a minimum sized bowl and will, at the same time, have a large squeezing surface.

In general, my invention contemplates the provision of a base having a pedestal of any suitable design. Upon this pedestal I removably position a substantial hemispherical bowl with the peripheral edge mounted at a slight angle. Adjacent the edge of this bowl I pivot, in any suitable manner, a presser member comprising a spherical segment and provided with an operating lever. That portion of the segment furthest from the pivot has a stepped zone, the purpose of which will be hereinafter more fully described. In the bottom of the spherical bowl I provide a drain opening to permit the juice extracted to drain. Above the drain opening I position in any suitable manner a strainer adapted to remove the seeds from the juice being extracted before reaching the drain opening.

In the accompanying drawing which forms part of the instant specification and which are to be read in conjunction therewith and in which like reference numerals serve to indicate like parts in the various views:

Figure 1 shows a perspective view of my juice extractor.

Figure 2 shows a sectional elevation of my juice extractor.

Figure 3 shows a fragmentary perspective view of the rear of my juice extractor at the point of the bowl mounting.

Figure 4 is a sectional view taken on the line 4—4 of Figure 3.

Figure 5 is a plan view of the presser member of my juice extractor.

More particularly referring now to the drawing, upon any suitable base 1 which may be provided with rubber members 2, I mount a pedestal 3 provided with a pair of lugs 4 to form a space in which a glass may be set underneath the hemispherical bowl 5. The hemispherical bowl 5 is provided with an integral socket portion 6. The socket portion 6 is adapted to fit upon the end of the pedestal 3. It will be noted that the socket member 6 is provided with a projection 7. This projection has a convex face adapted to coact with the concave portion 8 of the pedestal 3. The sides 9 and 10 of the pedestal 3 are tapered and adapted to coact with the tapered lateral sides of the socket 6. The portion of the socket 6 nearest the bowl 5 is provided with a convexity 11 which is adapted to mesh with the concavity formed in the engaging surface of the pedestal member 3. This can be readily seen by reference to Figure 4. The result of the joint above described is to make a firm connection between the bowl 5 and the pedestal 3. At the same time, this bowl is removable to admit of ready cleaning as will be hereinafter more fully pointed out. Thus mounted, the spherical bowl 5 will be downwardly inclined as can be readily seen by reference to Figure 2. This downward inclination of the bowl will have the effect of permitting liquid placed therein to accumulate at the portion thereof furthest from the pedestal. At the lowest portion of the bowl, I provide an orifice 12. In the upper portion of the bowl immediately above the pedestal I provide a rabbet or a slotlike portion in which is pivoted the lug 13 which is integral with the spherical segment which forms the presser member. This spherical segment 14 can be readily seen by reference to Figures 1, 2, and 5. A pivot pin 15 forms the axis around which the presser member is hinged. The presser member comprises the spherical segment 14 and the lever 16, the end of which is provided with any suitable handle 17. A spherical segment is formed by passing two planes at angles to each other through a sphere. One of these intersecting planes will form a substantially flat surface 18 on the spherical presser segment. Adjacent the spherical surface near the surface 18 I provide a boss 19. This boss extends in a marginal fashion over the spherical surface adjacent the intersecting surface 18. When an orange is fully squeezed as shown in Figure 2, in which the orange is represented by reference numeral 20, a fringe of pulp 21 is extruded from the orange peel. Ordinarily this fringe of pulp contains much juice which is never recovered in the juice extractors of the prior art. The boss 19 is designed to extend beyond the periphery of the peel 20 and squeeze the juice out of the fringe 21 as will be readily appreciated by reference to Figure 2. A strainer plate 30 is seated in the bowl 5 and is provided with perforations 31 as can be readily seen by reference to Figure 2. The juice, before it can reach the orifice 12, must pass through the strainer plate 13. This strainer plate rests against the inner marginal periphery of the lower end of the bowl. An extension 32 may be provided to enable its ready removal. A lug 33 is cast integrally with the strainer member and extends into the orifice 12 to position the lower part of the strainer. If desired, lugs may be provided on the inner side of the bowl to position the strainer in any desired position.

In operation, an orange is cut in two and the cut surface placed against the strainer 31. The presser member is then moved into pressing position and pressure exerted by means of lever 16. Due to the fact that one spherical surface is contacting another spherical surface, the area being pressed will progressively increase in a uniform ratio so that the juice will be extracted in a steady stream. Due to the fact that a large pressing surface is presented which is uniform inasmuch as a spherical surface is acting against a spherical surface, there will be no distortion of the peel and the juice will be uniformly extracted throughout the orange. The fringe of pulp which forms will have the juice extracted therefrom by means of the boss 19. The juice will be strained through strainer 31 and will pass into any suitable receptacle which may be placed below the orifice 12. When it is desired to clean the device, all that is necessary is to lift the presser member, remove the orange peel, lift the bowl from the pedestal and flush the entire inside of the bowl.

It will be appreciated that I have accomplished the objects of my invention. I have provided a juice extractor which will produce the maximum amount of juice from an orange or citrus fruit of any nature without breaking the skin. I am enabled to accommodate the largest sized fruit with a minimum sized bowl. I am enabled to extract substantially all of the juice from the orange without breaking the skin thereof and thus spoiling the taste of the juice. My construction is simple, easily cleaned, and enables juice to be extracted with a minimum amount of effort.

Having thus described my invention, what I claim is:

1. A juice extractor comprising in combination a substantially hemispherical bowl provided with a juice discharge outlet, a presser member pivoted adjacent the upper periphery of the bowl and adapted to press fruit against the bowl, a strainer plate removably positioned in said bowl, having perforations extending substantially to the edge of the bowl, said strainer, throughout the perforated portion, being spaced apart from the inner bowl surface and having peripheral contact only with said inner bowl surface to provide a juice receiving chamber, said discharge outlet communicating with said chamber, said strainer plate being provided with a lug adapted to seat in said juice discharge outlet when said strainer plate is in position.

2. A juice extractor comprising in combination a substantially hemispherical bowl provided with a juice discharge outlet, a presser member pivoted adjacent the upper periphery of the bowl and adapted to press fruit against the bowl, a strainer plate removably positioned in said bowl, having perforations extending substantially to the edge of the bowl, said strainer, throughout the perforated portion, being spaced apart from the inner bowl surface and having peripheral contact only with said inner bowl surface to provide a juice receiving chamber, said discharge outlet communicating with said chamber, said strainer plate being provided with a skirting adapted to spacedly position the upper portion thereof from said bowl.

JOSEPH M. MAJEWSKI, Jr.